United States Patent
Kitawaki et al.

(10) Patent No.: US 6,940,550 B2
(45) Date of Patent: Sep. 6, 2005

(54) DIGITAL CAMERA AND A METHOD FOR CORRECTING DUST IMAGES IN THE CAMERA

(75) Inventors: Reiko Kitawaki, Asaka (JP); Chiaki Ichikawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 630 days.

(21) Appl. No.: 10/026,807

(22) Filed: Dec. 27, 2001

(65) Prior Publication Data

US 2002/0093577 A1 Jul. 18, 2002

(30) Foreign Application Priority Data

Jan. 12, 2001 (JP) ........................................ 2001-004404

(51) Int. Cl.[7] ................................................. H04N 9/64
(52) U.S. Cl. ..................... 348/246; 348/231.6; 382/275
(58) Field of Search .............................. 348/246, 231.6, 348/231.3, 222.1; 382/275

(56) References Cited

U.S. PATENT DOCUMENTS 6,035,072 A * 3/2000 Read .......................... 382/275
6,233,364 B1 * 5/2001 Krainiouk et al. .......... 382/275
6,340,989 B1 * 1/2002 Oda ............................ 348/246
6,791,608 B1 * 9/2004 Miyazawa .................. 348/246

* cited by examiner

*Primary Examiner*—Tuan Ho
*Assistant Examiner*—Heather R. Long
(74) *Attorney, Agent, or Firm*—Birch, Stewart, Kolasch & Birch, LLP

(57) ABSTRACT

An all-white reference subject is imaged by a CCD and image data representing the reference subject is obtained. The position of any dust on the reference subject represented by the reference-subject image data is detected by a dust position detector. Address data representing the position of the dust is stored in a memory that stores dust address data. When the user images a subject, image data obtained by such imaging is input to a dust correction circuit. The dust address data is read from the memory and the image at the position represented by this dust address data is eliminated from the image of the subject by reason of the fact that the image at this position is that of dust.

3 Claims, 4 Drawing Sheets

| IMAGING CONDITIONS | | DUST ADDRESS |
|---|---|---|
| FOCAL LENGTH | F-STOP NUMBER | |
| 20mm | F32 | (x1,y1)(x2,y2) |
| | F16 | (x3,y3)(x4,y4) |
| | F11 | (x5,y5)(x6,y6) |
| | F8 | ...... |
| | F5.6 | ...... |
| | F4 | ...... |
| | F2.6 | ...... |
| | F2 | ...... |
| 25mm | F32 | ...... |
| | F16 | ...... |
| | : | ...... |
| | | ...... |
| | F2.8 | ...... |
| | F2 | ...... |
| 50mm | F32 | ...... |
| | F16 | ...... |
| | : | ...... |
| | | ...... |
| | F2.8 | ...... |
| | F2 | ...... |
| 70mm | F32 | ...... |
| | F16 | ...... |
| | : | ...... |
| | | ...... |
| | F2.8 | ...... |
| | F2 | ...... |
| 105mm | F32 | ...... |
| | F16 | ...... |
| | : | ...... |
| | | ...... |
| | F2.8 | ...... |
| | F2 | ...... |

*Fig. 4*

| IMAGING CONDITIONS | | DUST ADDRESS |
|---|---|---|
| FOCAL LENGTH | F-STOP NUMBER | |
| 20mm | F32 | (x1,y1)(x2,y2) |
| | F16 | (x3,y3)(x4,y4) |
| | F11 | (x5,y5)(x6,y6) |
| | F8 | ...... |
| | F5.6 | ...... |
| | F4 | ...... |
| | F2.6 | ...... |
| | F2 | ...... |
| 25mm | F32 | ...... |
| | F16 | ...... |
| | : | ...... |
| | : | ...... |
| | F2.8 | ...... |
| | F2 | ...... |
| 50mm | F32 | ...... |
| | F16 | ...... |
| | : | ...... |
| | : | ...... |
| | F2.8 | ...... |
| | F2 | ...... |
| 70mm | F32 | ...... |
| | F16 | ...... |
| | : | ...... |
| | : | ...... |
| | F2.8 | ...... |
| | F2 | ...... |
| 105mm | F32 | ...... |
| | F16 | ...... |
| | : | ...... |
| | : | ...... |
| | F2.8 | ...... |
| | F2 | ...... |

DIGITAL CAMERA AND A METHOD FOR CORRECTING DUST IMAGES IN THE CAMERA

BACKGROUND OF THE INVENTION

1. Field of the Invention

This invention relates to a digital camera (inclusive of a digital still camera, a digital movie camera and a personal digital assistant having a camera function) having an imaging device for sensing the image of a subject using a solid-state image sensor and outputting image data representing the image of the subject, and an imaging lens for forming the image of the subject on the photoreceptive surface of the solid-state image sensor, and to a method of controlling the operation of the digital camera.

2. Description of the Related Art

A digital still camera obtains image data representing the image of a subject by sensing the image of the subject using a CCD and records the image data on a recording medium such as a memory card. If dust or the like attaches itself to the photoreceptive surface of the CCD, the image of the dust appears on the image sensed. Though there are instances where an optical low-pass filter is provided in front of the CCD, the image of any dust that has attached itself to the low-pass filter will appear on the image obtained by sensing.

Dust or the like on the photoreceptive surface of a CCD or dust on an optical low-pass filter cannot be removed from outside the digital still camera. When the sensed image is printed, therefore, the image of the dust also shows up in the print.

DISCLOSURE OF THE INVENTION

Accordingly, an object of the present invention is to eliminate the image of dust or the like from an image obtained by image sensing.

According to the present invention, the foregoing object is attained by providing a digital camera having an imaging device for sensing the image of a subject using a solid-state image sensor and outputting image data representing the image of the subject, and an imaging lens for forming the image of the subject on a photoreceptive surface of the solid-state image sensor, comprising: a dust position detector operative in a dust detection mode for detecting the position of dust on an image, which is represented by image data output from the imaging device, on the basis of image data output from the imaging device; a storage device for storing the dust position detected by the dust position detector; and a correction unit operative in an image sensing mode for correcting for the image of the dust, at the position stored in the storage device, in the image of the subject represented by the image data output from the imaging device.

The present invention provides also an operation control method suited to the camera described above. Specifically, the invention provides a method of controlling operation of a digital camera having an imaging device for sensing the image of a subject using a solid-state image sensor and outputting image data representing the image of the subject, and an imaging lens for forming the image of the subject on a photoreceptive surface of the solid-state image sensor, the method comprising the steps of: detecting, in a dust detection mode, the position of dust on an image, which is represented by image data output from the imaging device, on the basis of image data output from the imaging device; storing the detected dust position; and correcting, in an image sensing mode, the image of the dust at the stored position in the image of the subject represented by the image data output from the imaging device.

In accordance with the present invention, the position of dust (inclusive of scratches and contaminants) on an image obtained by image sensing is detected in a dust detection mode and the detected position of the dust is stored.

When image data representing the image of a subject is obtained by sensing the image of the subject in an image sensing mode, the stored position of the dust is read out and the image at the stored position of the dust is judged to be that of dust. The image of the dust is corrected (as by elimination, color correction or interpolation based upon the surrounding pixels, etc.) in the image of the subject obtained by image sensing. Since the image of the dust is removed from the corrected image, it is possible to obtain a clean, attractive image of the subject.

In a case where the imaging lens is detachable from the digital camera, the storage device would store the dust position, which has been detected by the dust position detector, in association with the magnification of the imaging lens. Further, in the image sensing mode, the correction unit would correct for the image of dust at the position conforming to the magnification of the imaging lens that has been mounted.

Thus, the image of dust can be removed from the image of the subject even when one imaging lens is exchanged for another.

When a diaphragm has been provided in front the solid-state image sensor, the storage device would store the dust position, which has been detected by the dust position detector, in association with a combination of the f-stop number of the diaphragm and the magnification of the imaging lens. Further, in the image sensing mode, the correction unit would correct for the image of the dust at the position conforming to the combination of the f-stop number and magnification of the imaging lens.

There are instances where the position of a dust image changes depending upon the f-stop number. The above arrangement makes it possible to eliminate the image of the dust even when the f-stop number changes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a table stored in a memory that stores dust address data according to the present invention.

DESCRIPTION OF THE PREFERRED EMBODIMENT

A preferred embodiment of the present invention will now be described with reference to the drawings.

Figure 1:
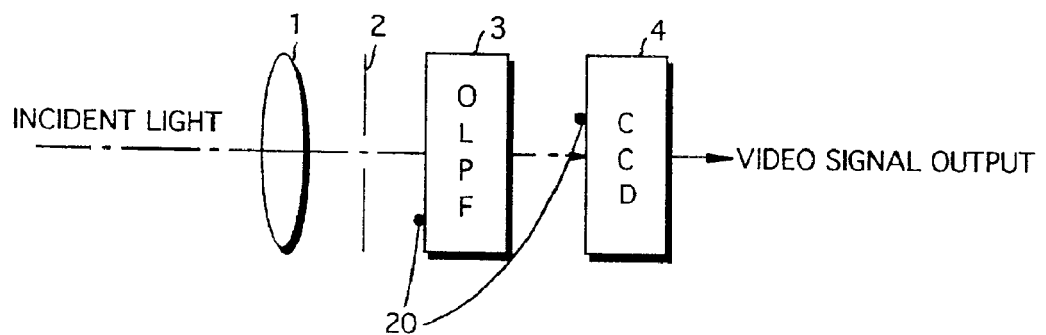
FIG. 1 is a diagram showing the structure of an imaging section.

FIG. 1 is a diagram showing the structure of an imaging section in a digital still camera according to a preferred embodiment of the present invention.

A light image representing the image of a subject is formed on the photoreceptive surface of a CCD 4 by an imaging lens 1. A diaphragm 2 and an optical low-pass filter 3 are provided between the imaging lens 1 and the CCD 4. The amount of light representing the image of the subject that impinges upon the CCD 4 is limited by the diaphragm 2. Noise included in the incident light representing the image of the subject is removed by the optical low-pass filter 3. Hence the CCD 4 outputs a video signal representing the image of the subject.

There are occasions where dust 20 attaches itself to the vapor-deposition surface of the optical low-pass filter 3 and to the photoreceptive surface of the CCD 4 during the manufacture of the imaging section. If the dust 20 has attached itself to e.g., the vapor-deposition surface of the optical low-pass filter 3, its image will appear on the image represented by the video signal output from the CCD 4.

The digital still camera according to this embodiment is such that the image of the dust 20 is excluded from the image represented by the video signal that is output from the CCD 4.

Figure 2:
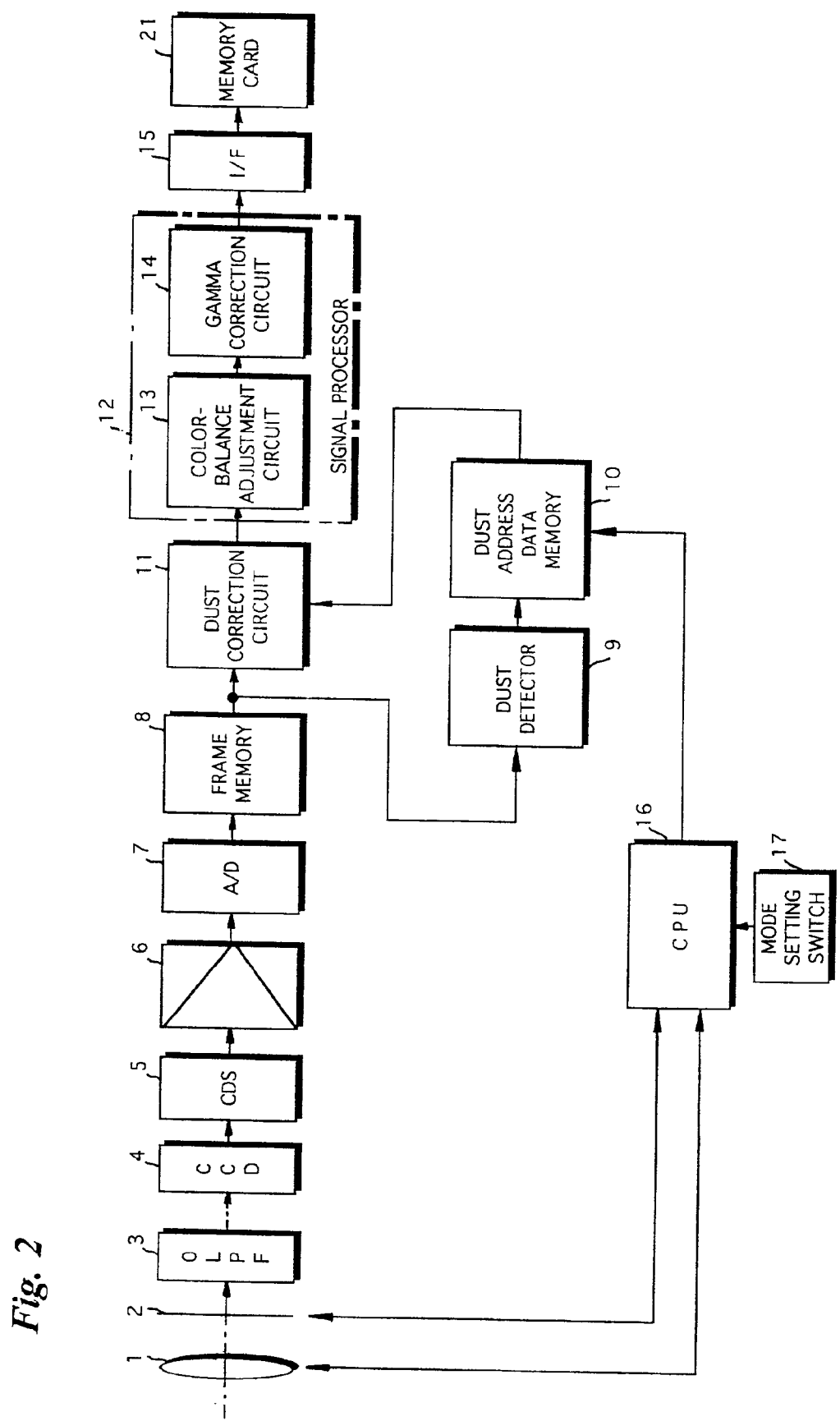
FIG. 2 is a block diagram illustrating the electrical construction of a digital still camera according to the present invention.
Figure 3:
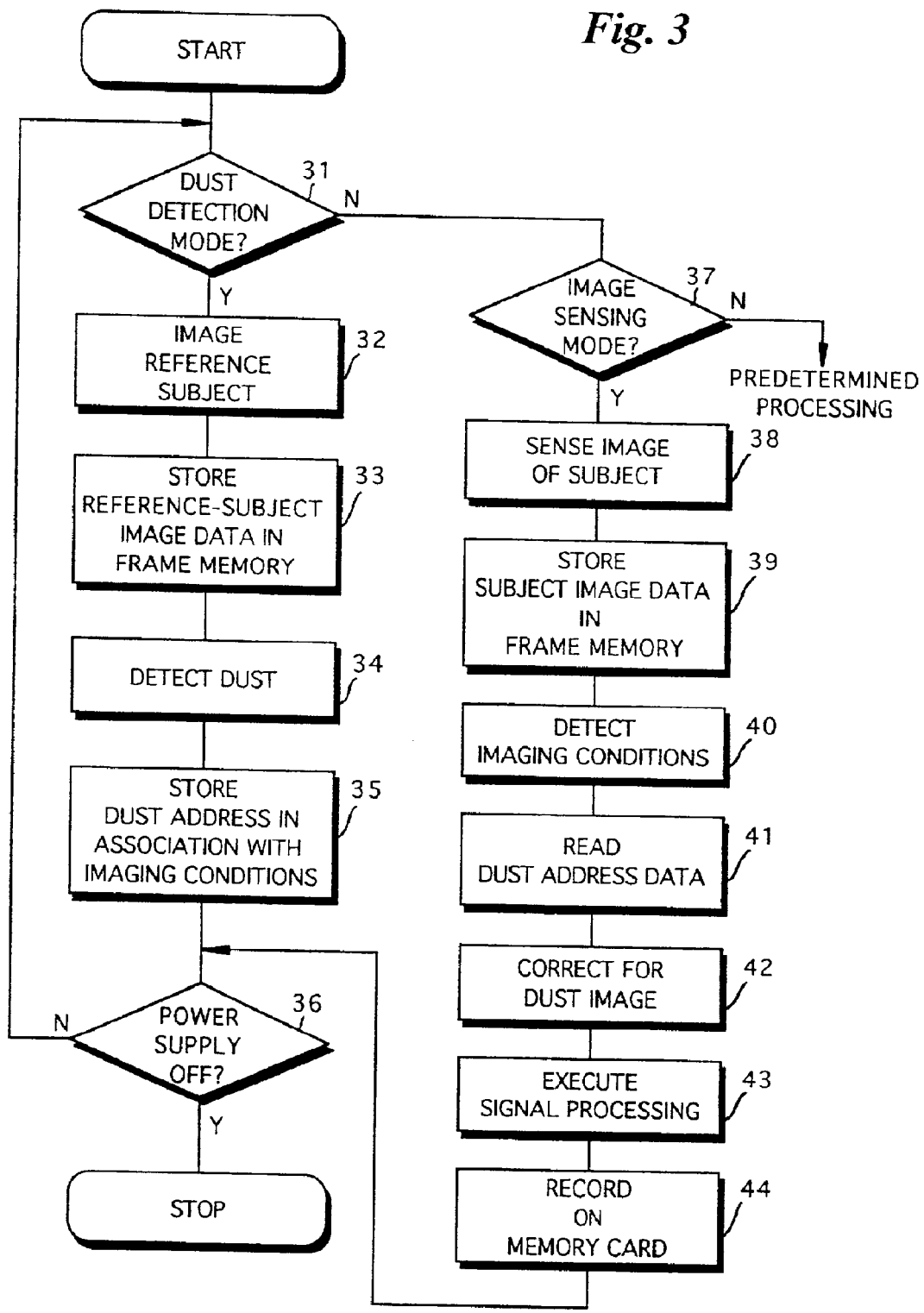
FIG. 3 is a flowchart illustrating processing executed by the digital still camera according to the present invention.

FIG. 2 is a block diagram illustrating the electrical construction of the digital still camera, and FIG. 3 is a flowchart illustrating the processing executed by the digital still camera.

The overall operation of the digital still camera is controlled by a CPU 16.

The digital still camera includes a mode setting switch 17, which is for setting a dust detection mode or an image sensing mode. A signal indicating the setting made by the mode setting switch 17 is input to the CPU 16. It goes without saying that the mechanical mode setting switch 17 need not necessarily be provided; what matters is that the modes can be set.

When the digital still camera is shipped from the factory, the dust detection mode is set to detect the position of the image of any dust that may appear on an image acquired by sensing. Data representing the position of the sensed dust is stored in a memory 10 (described later) for storing dust address data.

When the digital still camera has been shipped from the factory and is used by the user, the user sets the image sensing mode. When an image is obtained by sensing the image of a subject in the image sensing mode, the dust address data that has been stored in the memory 10 is read. The image at the position represented by the dust address data is eliminated from the image obtained by image sensing on the grounds that the image at this position is the image of dust. An image that is free of dust images is thus obtained. This will be described in detail below.

A reference subject (e.g., a single-color panel such as an all-white panel or all-gray panel) is prepared in the dust detection mode.

The imaging lens 1 is a zoom lens the magnification of which is changed by the CPU 16. The f-stop number of the diaphragm 2 also is set by the CPU 16. Since a large depth of field is preferred for a subject, it will suffice to select an f-stop number that stops down the diaphragm. The reason for this is that when the depth of field is large, it is easier for the dust to be seen because of the broader range of focusing.

The image of the subject is formed on the photoreceptive surface of the CCD 4 by the imaging lens 1. If the dust detection mode is set ("YES" at step 31), the reference subject is imaged and the CCD 4 outputs a video signal representing the image of the reference subject (step 32). The video signal is input to an analog/digital converter circuit 7 via a correlated double sampling circuit 5 and a preamplifier circuit 6. The analog/digital converter circuit 7 converts the analog video signal to digital image data. The latter is stored temporarily in a frame memory 8 (step 33).

The image data is read out of the frame memory 8 and input to a dust detector circuit 9. Since the reference subject is being imaged, the image represented by the image data read out of the frame memory 8 should be a single-color image such as an all-white or all-gray picture. If this image contains an image other than that of the color white or gray, then it will be understood that this is the image of dust. The position of this dust image is detected (step 34). Address data representing the position of the dust is input to the memory 10, where the data is stored in association with the focal length of the imaging lens 1 and the f-stop number (step 35). Detection of the dust image would utilize processing such as edge detection.

The magnification (focal length) of the imaging lens 1 and the f-stop number of the diaphragm 2 are changed and the reference subject is imaged in the same manner. The obtained dust address data is stored in the memory 10 in association with this focal distance and f-stop number. Since the position of the dust changes when the focal length and f-stop number change, the dust address data is stored in association with the focal length and f-stop number.

FIG. 4 illustrates the relationship, which have been stored in the memory 10, between the imaging conditions (focal length and f-stop number) and the corresponding dust addresses.

Dust addresses are stored in the memory 10 in association with the imaging conditions. It goes without saying that if multiple images of dust appear, then multiple dust addresses will be stored in the memory 10.

Thus, dust address data is stored in the memory 10 at the factory where the digital still camera is manufactured and the camera is then shipped from the factory with this data stored in the memory.

When the image sensing mode is set by the user ("YES" at step 37), the image of the subject is sensed by the CCD 4 (step 38) in the manner described above and a video signal representing the image of the subject is output. The video signal is input to the analog/digital converter circuit 7 via the correlated double sampling circuit 5 and preamplifier circuit 6. The analog/digital converter circuit 7 converts this signal to digital image data, which is then input to the frame memory 8 and stored there temporarily (step 39). The image data that has been stored in the frame memory 8 is read and input to a dust correction circuit 11.

The focal length of the imaging lens 1 and the f-stop number of the diaphragm 2 in the digital still camera are detected (step 40). Address data corresponding to the detected focal length and f-stop number are read out of the memory 10 (step 41) and input to the dust correction circuit 11.

The image at a position represented by dust address data on the image obtained by image sensing is judged to be the image of dust. A correction is applied by the dust correction circuit 11 in such a manner that the image at this position (in actuality, this would not be a single point at the position specified by the address data but would be a position slightly larger than a point) will take on a color the same as that of the surrounding color (step 42). This correction applied by the dust correction circuit 11 thus removes the image of the dust from the image obtained by image sensing.

The image data output from the dust correction circuit 11 is input to a color-balance adjustment circuit 13 in a signal processor 12. Image data that has undergone a color balance adjustment in the color-balance adjustment circuit 13 is subjected to a gamma correction in a gamma correction circuit 14. The corrected signal is then output from the signal processor 12.

Image data that has been output from the signal processor 12 is applied to a memory card 21 via an interface 15, whereby the data is recorded on the card (step 44). Since image data from which a dust image has been removed is recorded on the memory card 21, the image represented by the recorded image data can be printed as a clean image that is free of the appearance of dust.

The processing of steps 31 to 35 and steps 37 to 44 is repeated until the power supply is turned off (step 36).

The dust detection mode may be set to the user, but is not set at the factory. Further, when the imaging lens 1 is exchanged by the user, the dust address data may be stored in the memory 10 by setting of the dust detection mode.

As many apparently widely different embodiments of the present invention can be made without departing from the spirit and scope thereof, it is to be understood that the invention is not limited to the specific embodiments thereof except as defined in the appended claims.

What is claimed is:

1. A digital camera having an imaging device for sensing the image of a subject using a solid-state image sensor and outputting image data representing the image of the subject, and an imaging lens, which is detachable from the digital camera, for forming the image of the subject on a photoreceptive surface of the solid-state image sensor, comprising:

a dust position detector operative in a dust detection mode for detecting the position of dust on an image, which is represented by image data output from the imaging device, on the basis of image data output from the imaging device;

a storage device for storing the position of dust detected by said dust position detector, in association with magnification of the imaging lens; and a correction unit operative in an image sensing mode for correcting for the image of the dust, at the position stored in said storage device in the positions conforming to the magnification of the imaging lens that has been mounted, in the image of the subject represented by the image data output from the imaging device.

2. The digital camera according to claim 1, wherein a diaphragm has been provided in front of the solid-state image sensor;

said storage device stores the dust position, which has been detected by said dust position detector, in association with a combination of an f-stop number of the diaphragm and the magnification of the imaging lens; and in the image sensing mode, said correction unit corrects for the image of dust at the position conforming to the combination of the f-stop number and magnification of the imaging lens.

3. A method of controlling operation of a digital camera having an imaging device for sensing the image of a subject using a solid-state image sensor and outputting image data representing the image of the subject, and an imaging lens, which is detachable from the digital camera, for forming the image of the subject on a photoreceptive surface of the solid-state image sensor, the method comprising the steps of:

detecting, in a dust detection mode, the position of dust on an image, which is represented by image data output from the imaging device, on the basis of image data output from the imaging device;

storing the detected dust position, wherein the position of dust has been detected in associated with magnification of the imaging lens; and correcting, in an image sensing mode, the image of the dust at the stored position conforming to the magnification of the imaging lens that has been mounted, in the image of the subject represented by the image data output from the imaging device.

* * * * *